March 15, 1960 J. T. WEILLS ET AL 2,928,779
NEUTRONIC REACTOR CONSTRUCTION AND OPERATION
Filed Aug. 16, 1954 7 Sheets-Sheet 1

FIG. 1

INVENTORS
John M. West
Jordan T. Weills
BY
Roland A. Anderson
Attorney

FIG. 2

INVENTORS
John M. West
Jordan T. Weills
BY
Attorney

FIG. 8

INVENTORS
John M. West
Jordan T. Weills
BY

Attorney

INVENTORS
John M. West
Jordan T. Weills
BY
Attorney

March 15, 1960     J. T. WEILLS ET AL     2,928,779
NEUTRONIC REACTOR CONSTRUCTION AND OPERATION
Filed Aug. 16, 1954

INVENTORS
John M. West
Jordan T. Weills
BY

Attorney

United States Patent Office 2,928,779
Patented Mar. 15, 1960

2,928,779
NEUTRONIC REACTOR CONSTRUCTION AND OPERATION

Jordan T. Weills and John M. West, Downers Grove, Ill., assignors to the United States of America as represented by the United States Atomic Energy Commission Application August 16, 1954, Serial No. 450,282

8 Claims. (Cl. 204—154.2)

The present invention relates generally to neutronic reactors and to methods of operating neutronic reactors.

After a neutronic reactor has been completed, but before it has been operated for the first time, there are no fission fragments present within the reactor structure to alter the neutron multiplication factor, i.e., the ratio of the number of neutrons in one generation to the number of neutrons in the preceding generation within the active portion of a reactor of infinite size. Also, under these conditions the temperature of the reactor is that of the ambient atmosphere.

The reactor may be started by increasing the neutron reproduction ratio of the reactor, i.e., the ratio of the number of neutrons in one generation to the number of neutrons in the preceding generation for the neutronic reactor as it is actually constructed, including the effect of the control elements actually positioned within the active portion of the reactor. The neutron reproduction ratio may be increased in several ways, including removing neutron absorbing material from the active portion of the reactor, introducing additional quantities of fuel into the active portion of the reactor, and selecting the energy of the neutrons impinging on the fissionable material within the active portion of the reactor. In order to initiate the neutronic chain reaction, the neutron reproduction ratio must at least equal unity, and the extent to which the neutron reproduction ratio exceeds unity will determine the period of the reactor; or in other words, the time required for the reactor to increase its neutron flux by a factor of $e$, or 2.718.

As a neutronic chain reaction develops, certain nuclear changes occur within the reactor which affect the neutron reproduction ratio of the reactor. In the first place, power is liberated by the process of neutronic fission and heats the reactor. The increased temperature of most reactor fuel materials has a deleterious effect upon the neutron reproduction ratio of the reactor, as does the increased temperature of moderator materials. However, increased temperature may reduce the neutron absorption of neutron absorbing materials in the reactor which are used as structural materials or coolant. Thus, a reactor may have either a positive or a negative temperature coefficient of reactivity, i.e., reactivity change with a change in the average temperature of the reactor active portion. Secondly, operation of the neutronic reactor also results in the formation of fission products, and the fission products produced will in general change the neutron reproduction ratio of the reactor, since they will not have the same neutron capture cross sections as the material consumed or transmuted by the reaction.

One of the most important changes in the neutron reproduction ratio of a neutronic reactor resulting from the formation of fission products is that resulting from the formation of a concentration of $Xe^{135}$ through the process of fissioning $U^{235}$. One of the fission products from $U^{235}$ is $Te^{135}$ which initiates the following decay chain.

The figures in the parentheses indicate the half-life of the respective element. Even though $Xe^{135}$ does not exist in a neutronic reactor in large quantities, it has a large adverse effect upon reactivity, since it has a neutron capture cross section of approximately $3.2 \times 10^6$ barns at about .025 e.v. average neutron energy. In the presence of a neutron flux, the concentration of $Xe^{135}$ within a reactor may be determined at any given time $t$ by the equation $$N_{Xe} = \frac{\lambda_I}{\lambda_I - \lambda_{Xe}} \int_0^t CP(\tau)[e^{-\lambda_{Xe}(t-\tau)} - e^{-\lambda_I(T-\tau)}]d\tau$$

where $\lambda_I$ is the iodine decay constant, and equals 0.1050 per hour, $\lambda_{Xe}$ is the xenon decay constant and equals 0.0737 per hour, $P(\tau)$ is the power level of the reactor in kilowatts, and C is a proportionality constant for the reactor. The production of $Xe^{135}$ in the active portion of a reactor depends upon the amount of $I^{135}$ present in the reactor which in turn is a function of the number of fissions occurring in the reactor and proportional to the neutron flux.

Also, the destruction of $Xe^{135}$ occurs in two ways. First, the $Xe^{135}$ decays to $Cs^{135}$, and second, the $Xe^{135}$ may capture a neutron to become $Xe^{136}$. In either case, the reactivity of the reactor is increased, since both of these isotopes have very much smaller neutron capture cross sections than $Xe^{135}$. Because $Xe^{135}$ has a half-life of approximately 9.4 hours, approximately 99 percent of the xenon present in a neutronic reactor will decay within a period of 72 hours in the absence of a neutron flux.

When the neutron flux density within the reactor has been maintained at a relatively constant level over a rather long period of time, the concentration of $Xe^{135}$ will reach a relatively constant or equilibrium value. As set forth in the equation above, this value is a function of the power level of a particular neutronic reactor, because it depends upon the neutron flux for a substantial fraction of the destruction of $Xe^{135}$ and upon the rate of fissions for the production of $I^{135}$. For these reasons, neutronic reactors operating at large power levels per unit of fissionable material produce substantial quantities of $Xe^{135}$ and require greater excess reactivities to overcome the neutron absorption of the $Xe^{135}$ than do reactors operating at relatively low power levels, excess reactivity being defined as the amount by which the maximum neutron reproduction ratio of the reactor without fission products exceeds unity, the maximum neutron reproduction ratio of the reactor being the reproduction ratio of the reactor with the control means in its most favorable position.

However, regardless of the power level of the reactor, when a neutronic reactor is shut down, the destruction of $Xe^{135}$ by the capture of neutrons ceases, since a substantial neutron flux no longer exists in the active portion of the reactor. The destruction of $Xe^{135}$ is then due solely to radioactive decay which produces $Cs^{135}$. However, the rate of production of $Xe^{135}$ decreases exponentially following shutdown of the neutronic reactor, since the supply of $I^{135}$ is reduced in this manner. For this reason, $I^{135}$ continues to decay to $Xe^{135}$ which builds up to a greater concentration than is possible when the neutronic reactor is operating, this increased $Xe^{135}$ concentration being called the "peak" concentration. If the neutronic reactor remains inoperative, the $Xe^{135}$ reaches a maximum concentration and then decays, so that approximately 99 percent of the $Xe^{135}$ has decayed within 72 hours. However, if it is desired to start the reactor during hte peak concentration of $Xe^{135}$, it will be necessary to have sufficient excess reactivity to overcome the added neutron loss. For this reason, some neutronic reactors which have been constructed may only be restarted in a relatively short time following shutdown, or after the lapse of a sufficient period of time for the $Xe^{135}$ peak to decay.

If the neutronic reactor has sufficient excess reactivity to become chain reacting during the period of peak $Xe^{135}$ concentration, the $Xe^{135}$ present in the reactor is quickly destroyed by absorption of neutrons and transformation to $Xe^{136}$. The $Xe^{136}$ has a thermal neutron absorption cross section of approximately 0.15 barn, and hence has an effect upon the neutronic chain reaction many orders of magnitude less than that of its parent, $Xe^{135}$. Also, at the moment the neutronic chain reaction is re-initiated, the reactor contains relatively smaller quantities of $I^{135}$ than the equilibrium concentration, the $I^{135}$ having decayed to $Xe^{135}$. As a result, the production of $Xe^{135}$ is reduced. Hence, the neutron reproduction ratio of the reactor is increased and may increase to a value approaching the neutron reproduction ratio before the reactor has ever been operated, which is greater than the reactivity of the reactor with equilibrium $Xe^{135}$ concentration.

The reactivity surge of a reactor following start-up after a period of shutdown may create a problem in control of the reactor. Reactors are operated with safety controls and regulating controls, and it may be necessary in restarting a neutronic reactor of this type to employ more control than the regulating control elements provide. Since it is considered to be an unsafe operating procedure to position the safety controls to overcome the reactivity peak caused by xenon decay, certain reactors have been operated with columns of neutron poison materials, such as boron or cadmium, inserted into the active portion of the reactors to overcome the reactivity peak occurring after start-up However, when equilibrium conditions between the $I^{135}$ and $Xe^{135}$ are re-established under a constant power level of operation, it is necessary to remove the poison columns from the reactor, thus necessitating a shutdown for the period of time required to accomplish the removal of these columns.

It is an object of the present invention to provide a method of operating a neutronic reactor which will provide a constant reactivity following the start-up of the reactor after a period of operation.

It is also an object of the present invention to provide a neutronic reactor which may be started after shutdown following a prolonged period of operation without significant changes in reactivity.

One of the difficulties resulting from the introduction of neutron absorbing materials into the reactor for the purpose of controlling the reactivity peak following start-up after a period of operation is that the presence of the neutron absorbing materials within the reactor active portion distorts the neutron flux pattern within the reactor. In any location in which a body of neutron absorbing material is disposed, there will be a diminution in the neutron flux density. If a neutronic reactor is to be used for the irradiation of materials, the conducting of experiments, or the production of power, the distortion of the flux pattern of the reactor may have a deleterious effect on the performance of the reactor. Also, research reactors are sometimes constructed with small specific masses, and hence, such reactors suffer greater neutron flux distortions than power reactors. Hence, it is also an object of the present invention to provide a neutronic reactor which may be started after a period of shutdown without serious distortion of the neutron flux pattern within the active portion of the reactor.

Other objects and advantages of the present invention will be readily understood by the man skilled in the art from a further reading of the present specification, particularly when viewed in the light of the drawings, in which:

Figure 11 is a graph showing the relation of the peak xenon 135 loss in percent $$\frac{\delta k}{k}$$

for 2000 kw. of power to the period of shutdown, the reactor having established equilibrium xenon 135 prior to shutdown;

Figure 14 is a graph showing the magnitude of the xenon poisoning in the reactor in percent $$\frac{\delta k}{k}$$

throughout a period of reactor operation at 2000 kw., including a 2¼ hour period of shutdown;

The present invention comprises varying a characteristic of the active portion of the reactor which contributes a negative coefficient of reactivity to compensate for the increased reactivity of the reactor due to the decay of the xenon peak. Since most reactors exhibit negative temperature coefficients of reactivity, except for reactors which contain liquids having high neutron absorption coefficients for coolants and the like, it is possible to vary the temperature of the reactor to compensate for the change in reactor reactivity due to the burnup of the xenon peak following start-up of the reactor.

Most reactors have negative temperature coefficients of reactivity due to the fact that the density of the materials in the reactor decreases as the temperature rises. In order to determine whether a particular reactor will have a positive or negative temperature coefficient, the effect of temperature change upon each of the elements of the reactor must be individually evaluated in terms of the reactivity of the entire reactor. For example, in a natural uranium, graphite moderated, water cooled reactor, such as that disclosed in the patent application of Ulysses M. Staebler, entitled "Neutronic Reactor Operation," filed May 15, 1953, Serial No. 355,279, the temperature coefficient of reactivity of the reactor is positive, and in terms of power is equal to 0.46 inhour per megawatt. The positive temperature coefficient of reactivity results from the fact that the combined graphite and water moderation provides a reactivity coefficient of 0.66 inhour per megawatt which is large enough to overcome the negative coefficient of the uranium within the reactor, this coefficient being —0.20 inhour per megawatt. However, if the water coolant is removed from the coolant channels in the reactor, this reactor will also have a negative temperature coefficient of reactivity. In conditions generally encountered the temperature coefficient of the fuel within a reactor is negative, and the temperature coefficient of the moderator material within the reactor is also negative. If there are substantial quantities of materials having high neutron capture cross sections present in the reactor structure, there may be a positive coefficient of reactivity, particularly if these materials are in a liquid state, since decreasing the density of these materials may have a greater effect on the reactivity of the reactor than the effect of decreasing the density of the fuel and other moderator materials within the reactor.

The reactor shown in Figures 1 through 8 provides a negative temperature coefficient of reactivity and utilizes a heavy water moderator, heavy water coolant, and $U^{235}$ fuel. The heavy water moderator is contained within a tank 20, and has been designated by the reference numeral 22. Fuel elements 24 are vertically mounted within the tank 20 and contain $U^{235}$ fuel for the neutronic chain reaction. The region 26 surrounding the sides and bottom of the tank contains solid neutron reflecting material, this material being graphite in the form of blocks in the reactor construction which will be detailed in the present specification. A thermal shield 28 surrounds the region 26, and a concrete shield 30 surrounds the thermal shield 28.

Figure 17:
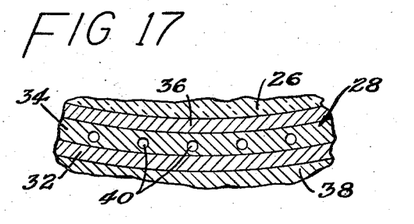
Figure 17 is an enlarged fragmentary sectional view of the reactor thermal shield.

In the construction of the reactor described throughout the present specification, the tank 20 is constructed of aluminum and has an inner diameter of 72 inches and a wall thickness of 1.27 centimeters. The total height of the tank 20 is 86 inches, the heavy water 22 extending to a height of 78 inches. The region 26 containing graphite is in the form of a hollow cylinder and contacts the outer surface of the aluminum tank 20, and has a thickness of 24 inches. The thermal shield 28 has three layers 32, 34 and 36, as illustrated in Figure 17. The outer layer 32 is a steel tank, the inner layer 34 is lead, and the center layer 36 is a boral liner, "boral" being a heterogeneous mixture of equal amounts of boron carbide ($B_4C$) and aluminum. A layer of lead bricks 38 surrounds the outer layer 32 of the thermal shield 28. A plurality of channels 40 extend through the thermal shield 28 and a water coolant flows through these channels to cool the thermal shield 28.

Figure 1:
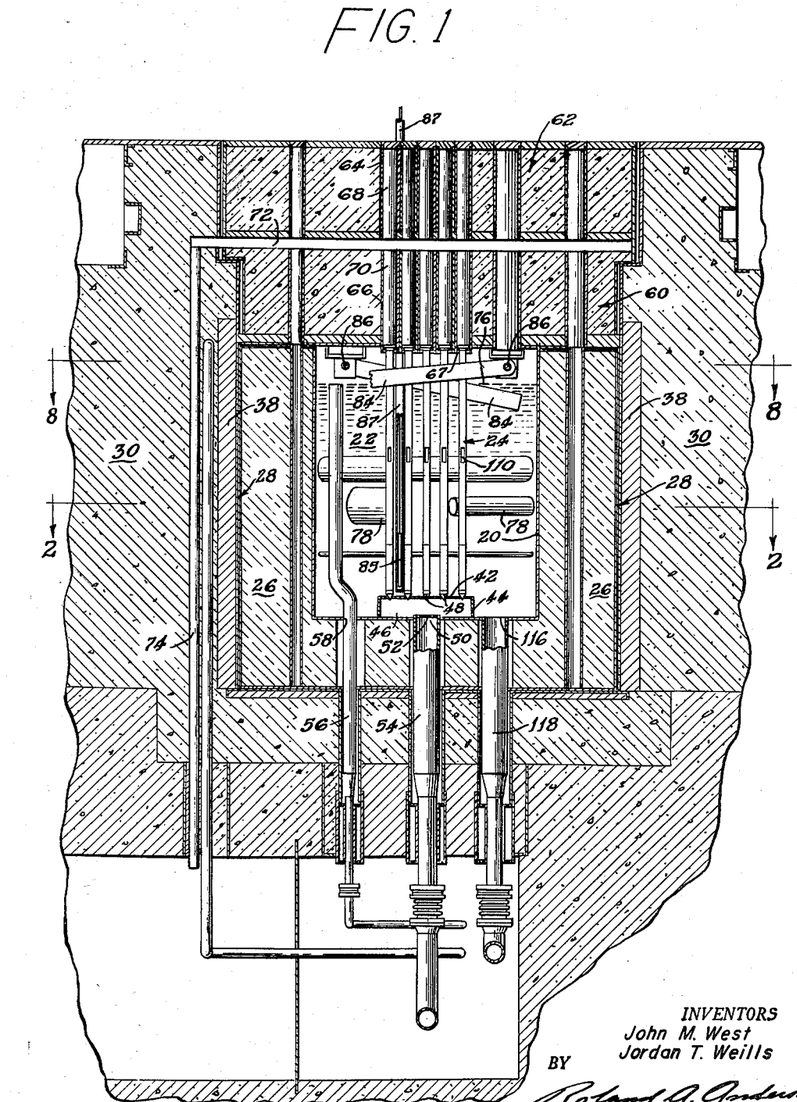
Figure 1 is a vertical sectional view of a neutronic reactor illustrating the present invention.

A mounting plate 42 is supported above the bottom of the tank 20 by an annular support member 44 which is sealed to both the tank 20 and the mounting plate 42. In this manner, a plenum chamber 46 is formed, the only access to the interior of the tank 20 being through apertures 48 in the mounting plate 42 which are provided to accommodate the fuel elements 24, the fuel elements 24 forming a seal within the apertures 48. The tank 20 is provided with an orifice 50 which opens into the plenum chamber 46, and a strainer 52 is disposed between the orifice 50 and the plenum chamber 46. A coolant inlet pipe 54 extends through the shield 30, thermal shield 28, and region 26 of graphite and is sealed within the orifice 50 in the tank 20. A flow of $D_2O$ for cooling the fuel elements 24 and filling the tank 20 enters the tank through the pipe 54 and orifice 50. An overflow pipe 56 is disposed within the tank 20, the mouth of the overflow pipe 56 being 78 inches above the bottom of the tank in the particular construction of the reactor described in this specification. The overflow pipe 56 extends through an aperture 58 in the base of the tank 20 and is sealed to the tank 20.

There are two shield assemblies 60 and 62 directly above the tank 20. The lower shield assembly 60 is immediately adjacent to the tank 20 and upper shield assembly 62 is above and adjacent to the lower shield assembly 60. Both the upper shield assembly 62 and the lower shield assembly 60 are provided with channels 64 and 66, respectively, which are directly above the apertures 48 in the mounting plate 42. Plugs 68 and 70 are disposed within the channels 64 and 66 and contain neutron and radiation absorbing materials. The plugs 68 and 70 may be removed from the channels 64 and 66 when the reactor is not operating in order to insert fuel elements 24 into the tank 20 of the reactor, the fuel elements 24 being maintained in parallel alignment by the apertures 48 in the plate 42 and retaining rings 67 disposed at the mouth of the channels 66.

In the particular construction of the reactor described throughout the present specification, the lower shield assembly 60 has a thickness of 2 feet 5⅝ inches and the upper shield assembly 62 has a thickness of 2 feet 7¼ inches. A cavity 72 of 2 9/16 inches is disposed between the upper shield assembly 62 and the lower shield assembly 60 and is connected to a source of helium through a helium line 74. The helium also fills the gap 76 between the surface of the heavy water moderator 22 and the lower shield assembly 60.

The reactor is also provided with access ports 78 which extend into the tank 20 and provides regions for the irradiation of materials. The access ports 78 are provided with shield plugs 80 which prevent the escape of radiation. The access ports 78 are provided with neutron and radiation permeable windows 82 which prevent the heavy water moderator 22 from entering the ports 78 but permit neutron beams to be ejected therethrough.

The reactor is provided with control arms 84 and a regulating control rod 85 which are constructed of neutron absorbing materials, such as cadmium or boron. The arms 84 pivot about a shaft 86 disposed adjacent to one end of each arm. The shafts 86 extend through the region 26, thermal shield 28 and shield 30 of the reactor to permit the operator to pivot the arms 84 within the reaction tank 20.

The reactor described has four control arms 84 in all. These arms contain boron sandwiched between aluminum plates, and are 2.5 centimeters thick by 14 centimeters wide and have a total length of approximately 150 centimeters. The arms 84 are disposed to pivot into the moderator 22 of the reactor between the fuel elements 24, two of these arms 84a being used as safety control elements. The safety control elements 84a are maintained in a withdrawn position adjacent to the surface of the moderator 22 at all times, except when it is desired to stop the neutronic chain reaction. The other arms 84b which may be disposed below the surface of the moderator 22 during normal reactor operation are used as "shim" elements. The shim elements are used to effect stepwise changes in reactivity of the reactor, these changes being necessary either to increase or decrease the power level of the reactor or to compensate for long term reactivity changes.

The control rod 85 is disposed exterior to the fuel portion of the reactor and is used as a "regulating" control element. It is this rod 85 which is used to compensate for small changes in reactivity and changes of relatively short time duration. It may be connected to an automatic control means, such as that disclosed in the patent application of Bernard C. Cerutti and Harold V. Lichtenberger, Serial No. 238,479, filed July 25, 1951, now Patent No. 2,682,785, issued on July 6, 1954.

Figure 15:
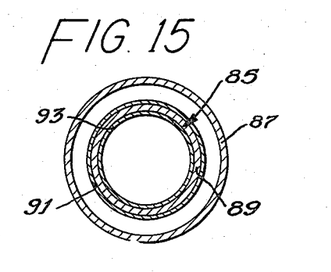
Figure 15 is a horizontal sectional view through the regulating rod of the reactor.

The control rod 85 in this construction is translatable within a thimble 87 constructed of aluminum which serves to keep the reactor atmosphere from seeping from the tank 20. The rod 85 is approximately 1½ inches in diameter and 2 feet long, and it is constructed of a tube 89 of cadmium and liners 91 and 93 of aluminum, thus forming a hollow rod, as illustrated in Figure 15.

In the reactor described throughout the present specification, the safety control elements 84a require 0.2 second to travel from the "out" position to the "in" position in the reactor, and 120 seconds to remove these elements from the reactor. They are effective in changing the ratio $$\frac{\delta k}{k}$$

by 10%, $\delta k$ being the change in the effective reproduction ratio averaged over the entire active portion of the reactor and $k$ being the maximum effective reproduction ratio, the maximum effective reproduction ratio being the ratio of the number of neutrons in one generation to the number of neutrons in the preceding generation in the actual reactor structure with control means in the position of maximum reactivity. The shim arms 84b require the same time to be inserted into the reactor and removed therefrom, but their effect upon the ratio $$\frac{\delta k}{k}$$

is only 8%. The regulating control rod 85 requires 12 seconds to travel from the "out" to the "in" position in the reactor and an equal time for removal. It is effective to control the ratio $$\frac{\delta k}{k}$$

by 0.6%. In terms of the maximum $$\frac{\delta k}{k}$$

per second increase, the safety arms 84a are capable of effecting an increase of 0.08% per second, the shim safety arms 84b are capable of effecting an increase of 0.07% per second and the regulating control rod 85 is capable of effecting an increase of 0.05% per second.

The reactor is designed to have an excess reactivity of 2.5 to 4.5 percent for the usual conditions of operation. Under these conditions, both of the safety arms 84a and the two shim arms 84b are disposed above the fuel regions of the fuel elements 24, or the core of the reactor. As a result, the neutron flux distribution of the reactor is disturbed primarily by the control rod 85 only, the neutron flux distribution in the horizontal plane particularly being free of perturbations due to shim arm absorption.

The fuel elements 24 for the reactor are shown in detail in Figures 3 through 7. The fuel elements 24 are provided with a flange 88 at one end and a tip 90 at the other end, the flange 88 being used to secure the fuel element 24 to the upper surface of the lower shield assembly 60, and the tips 90 being used to seal the fuel elements 24 within the apertures 48 in the mounting plate 42. Each fuel element 24 has three regions between the flange 88 and the tip 90, the center of these regions being a fuel region 92, and the other two regions being hollow regions 94 and 96. The core of the reactor is the region defined by the fuel regions 92 of the fuel elements 24.

The tip 90 is provided with an aperture 98 centrally thereof and has an outwardly extending centering member 100 positioned across the aperture 98 for the purpose of centering the fuel elements 24 in the apertures 48 in the mounting plate 42.

Figure 16:
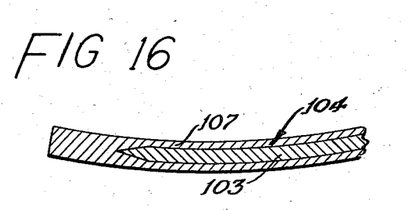
Figure 16 is a sectional view of one of the fuel plates 104 shown in Figure 5.

A sleeve 102 extends upwardly from the tip 90 through the hollow region 94 to the fuel region 92. A plurality of plates 104 containing an alloy of $U^{235}$ and aluminum, designated 103, are disposed within the fuel region 92, the plates 104 being slightly curved and attached between grooved support plates 106 and 108, the grooves being designated 109 and accommodating the fuel plates 104. End plates 105 are constructed of aluminum and contain no fissionable material. The plates 104 which contain the fissionable material are also clad in aluminum, as indicated at 107 in Figure 16.

Directly above the fuel region 92 is a second sleeve 101 which has an aperture 110 on each side for the purpose of permitting the coolant to dump from the interior of the fuel element 24 into the tank 20. Both sleeves 101 and 102 are constructed of 2S aluminum. A plug 111 is disposed adjacent to the flange 88 and is provided with an aperture 113 which permits the coolant to rise thereabove. A float 115 is disposed above the plug 111 and floats upon the "head" of the coolant flow. The float 115 is connected to a differential transformer, not shown, by a shaft 117, the output of the differential transformer being calibrated in terms of the rate of flow of coolant through the fuel element 24. A thermocouple 119 is also disposed within the second sleeve 101 and terminates adjacent to the apertures 110 for the purpose of measuring the temperature of the coolant as it exits from the fuel element 24.

In the particular reactor described, each of the fuel elements 24 is 81⅛ inches long, the tip 90 is 1¼ inches long to the point at which it rests upon the support plate 42, the hollow region 94 is 14¹⁵⁄₁₆ inches long, the fuel region 92 is 26⅝ inches long. The fuel region 92 is 2.940 inches from the outside of plate 106 to the outside plate 108, and 2.414 inches measured from the outer surfaces of plates 105. Plates 105, 106 and 108 are constructed of the type 2S aluminum. The specifications for the fuel plates are given in the following table:

Table 1.—*Specifications for fuel assembly plates*

| | |
|---|---|
| Over-all dimensions of plates 104: | |
| Length | 24⅝″±⅟₆₄″. |
| Width, before curving | 2.845″±0.001″. |
| Radius of curvature | 5½.″ |
| Thickness | 0.060″±0.001″. |
| Core dimensions 103 of plates 104: | |
| Length | 23⅝″±¼″. |
| Width | 2.55″±0.01″. |
| Thickness | 0.020″±0.001″. |
| Composition of Core 103 of Plates 104: | |
| $U^{235}$ content per plate | 9.55 gms.±1%. |
| $U^{235}$ enrichment | 93.2%. |
| Total uranium in uranium-aluminum alloy | 17.5%. |
| Aluminum type | 2S. |
| Cladding of plates 104: | |
| Composition | 2S aluminum. |
| Thickness | 0.020″±0.001″. |

Plates 105 have the same thickness as plates 104 but have a length of 26⅝ inches and are constructed of 2S aluminum.

For purposes of supporting the plates 104, a comb 112 and a comb 114 are provided with the teeth of the comb between adjacent plates 104, the comb being constructed of 2S aluminum in the particular construction described herein.

It is to be noted, that with the exceptions of dimensions and number of fuel plates 104, the fuel elements 24 have identical fuel regions 92 with those of the reactor disclosed in the copending patent application of Eugene P. Wigner, entitled "Neutronic Reactor," filed June 8, 1953, Serial No. 360,190, now Patent No. 2,832,-732, dated April 29, 1958.

In fourteen fuel elements 24, there are ten plates 104 spaced by a distance of 0.154 inch; in one fuel element $24b$ there are eight plates 104, the fuel element being identical to the element 24 except that the two center plates 104 are removed; and in the final fuel element $24c$ the three central plates 104 are removed. Hence, there may be a total of 155 plates 104 in the core of the reactor.

Figure 2:
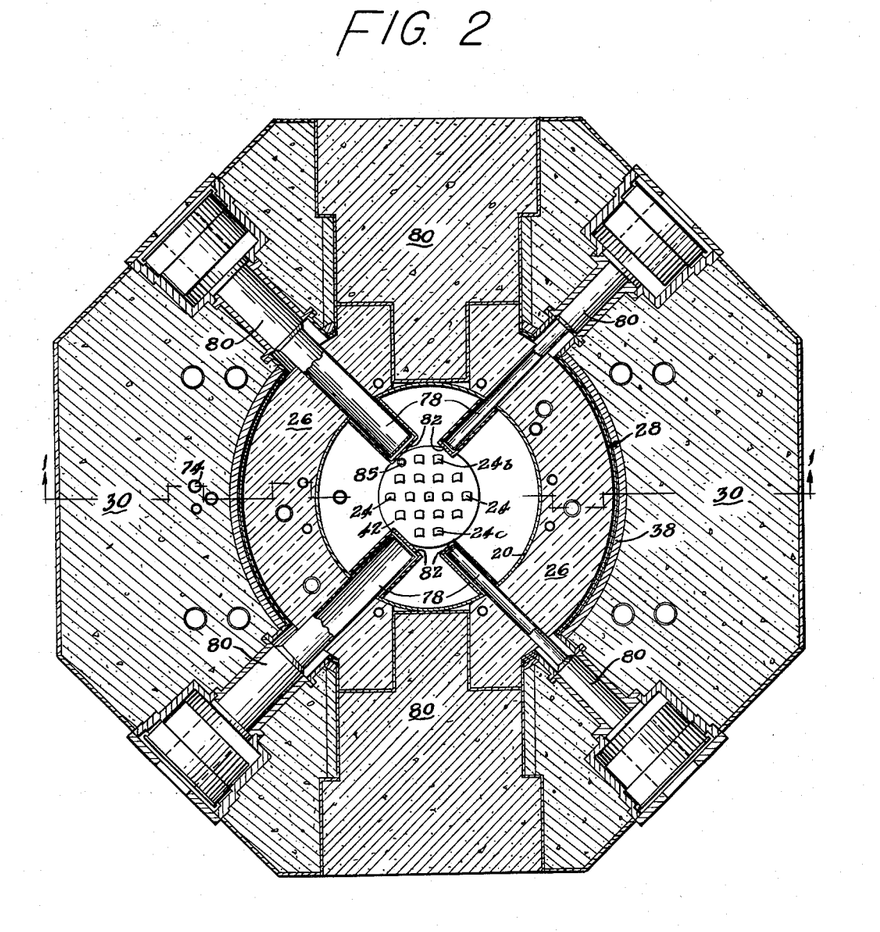
Figure 2 is a horizontal sectional view taken along line 2—2 of Figure 1.
Figure 3:
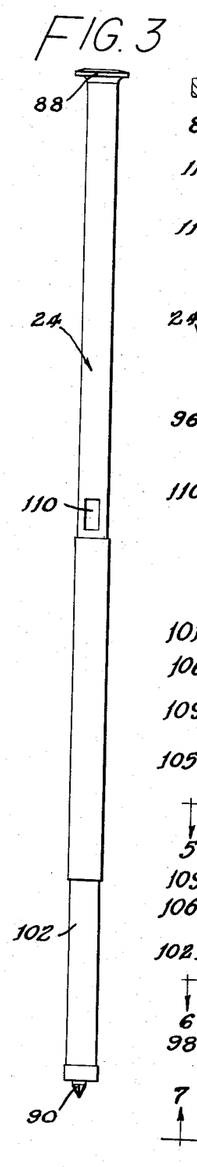
Figure 3 is an elevational view of a suitable fuel element for the neutronic reactor.
Figure 4:
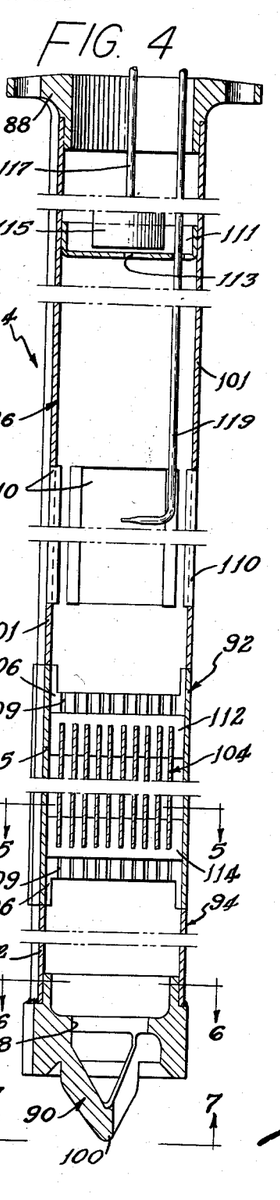
Figure 4 is a vertical sectional view of the fuel element illustrated in Figure 3.
Figure 5:
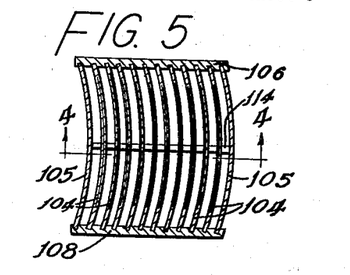
Figure 5 is a horizontal sectional view taken along line 5—5 of Figure 4.
Figure 6:
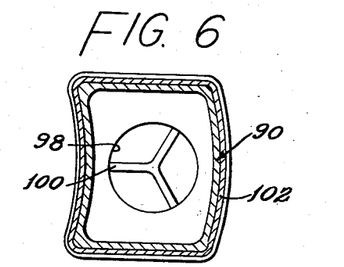
Figure 6 is a horizontal sectional view taken along line 6—6 of Figure 4.
Figure 7:
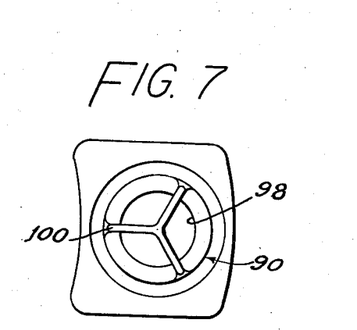
Figure 7 is an elevational view taken along line 7—7 illustrated in Figure 4.
Figure 8:
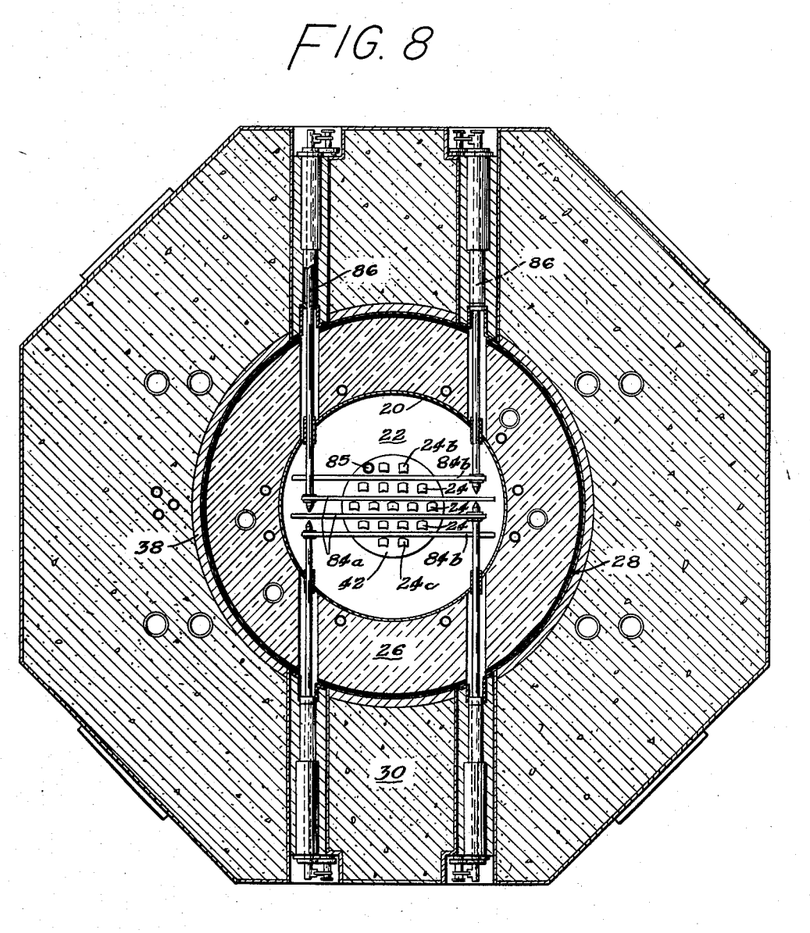
Figure 8 is a horizontal sectional view of the neutronic reactor taken along line 8—8 of Figure 1.

The fuel elements 24 are placed in a triangular lattice and spaced by six inches between centers, with the exception that the two outer fuel elements are aligned with the adjacent assemblies and spaced six inches therefrom, as illustrated in Figures 2 and 8.

When the reactor is loaded with fuel elements 24 which have never been irradiated, the shim and safety arms 84 being positioned adjacent to the surface of the moderator 22, or in other words, in the position of greatest reactivity, it will become critical with fifteen fuel elements 24. This assumes the fuel elements 24 occupy the fifteen central positions in the core, as well as a temperature of approximately 20° C. Also, the control rod 85 is approximately half withdrawn from the core of the reactor, its inner end being approximately adjacent to the center of the adjacent fuel elements 24.

After the reactor builds up fission products, it is necessary to use more fuel elements 24, $24b$ and $24c$ to operate the reactor. The number of fuel elements depends upon the operating conditions of the reactor, and ample facilities are provided for additional fuel elements in order to make the reactor versatile.

Figure 9:
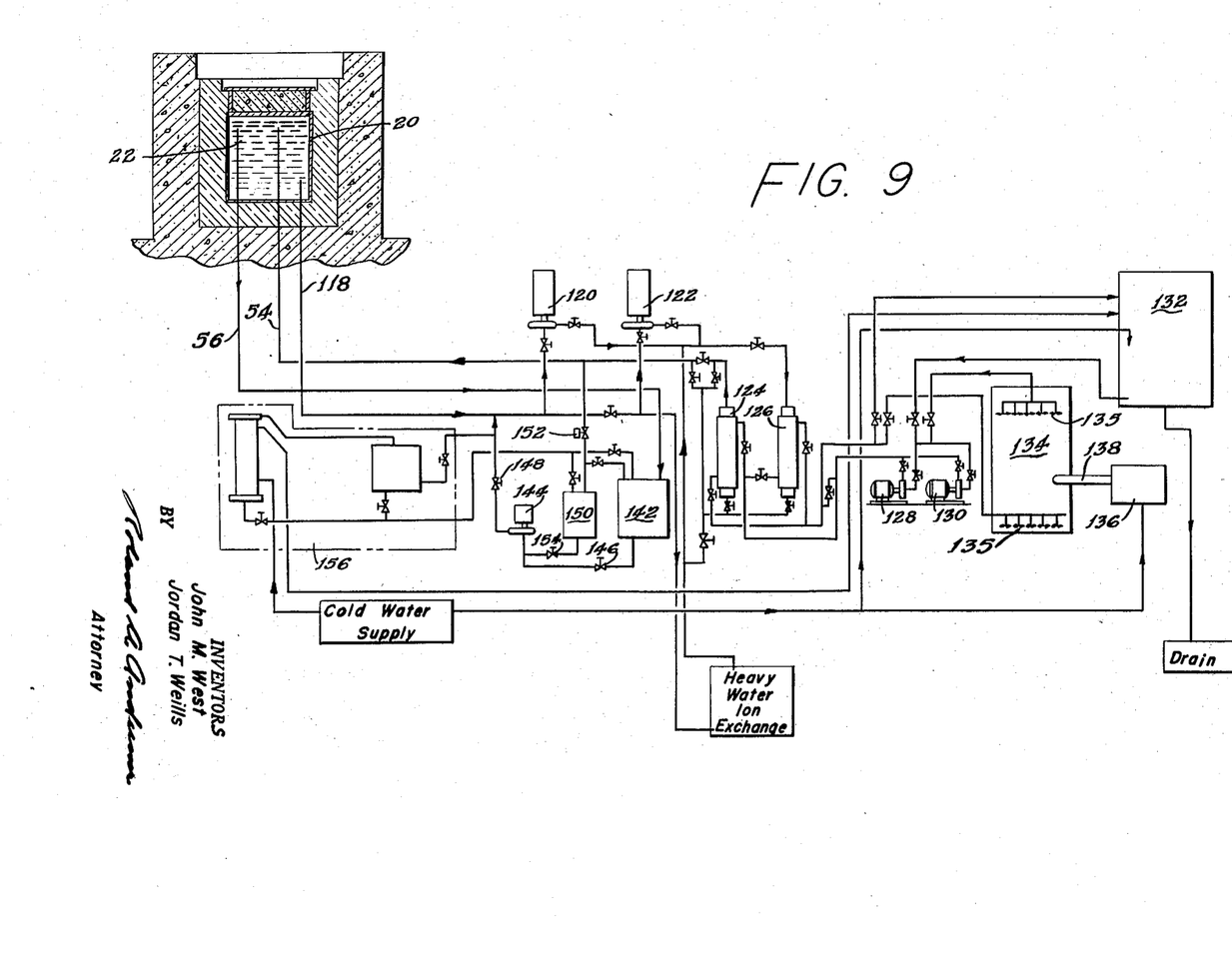
Figure 9 is a schematic diagram of the coolant system for the neutronic reactor.

The reactor cooling system is shown in Figures 1 and 9. A flow of $D_2O$ enters the plenum chamber 46 through the pipe 54. It then flows upwardly through the fuel elements 24 and out through the apertures 110 in the fuel elements 24 into the tank 20. The $D_2O$ flows out of the tank 20 through an orifice 116 at the bottom thereof and a pipe 118. The pipe 118 leads to a pump 120 and 122, only one of these pumps being used at a given time, and to a heat exchanger 124 or 126. Again, the heat exchangers 124 or 126 are employed in the alternative. The $D_2O$ which is heated by the neutronic chain reaction loses heat to a flow of $H_2O$ in the heat exchangers 124 or 126. The $H_2O$ is circulated through the heat exchangers 124 and 126 (which have heat exchange areas of 510 square feet) by pumps 128 or 130, only one of the pumps being used at a time, and through a cooling tower 132. As an alternative for the cooling tower 132, the $H_2O$ used to cool the $D_2O$ in the heat exchangers 124 or 126 may be supplied from a refrigerated water tank 134 which may be connected through the pumps 128 or 130 and the heat exchangers 124 or 126. A refrigeration unit 136 having a heat exchange loop 138 in the tank 134 is used to remove heat from the tank 134 and discharge it to the ambient atmosphere. The chilled water system is used to cool the reactor when the reactor is starting up after a period of shutdown following a prolonged period of operation for the purpose of compensating for the reactivity gain due to burnup of the xenon peak, as will be hereinafter described.

If the level of the $D_2O$ in the reaction tank 20 rises too high, the overflow pipe 56 conducts a portion of the $D_2O$ from the reaction tank to a storage tank 142. The $D_2O$ in the storage tank 142 may be returned to the cooling cycle through a pump 144 when valves 146 and 148 are properly positioned. Also, a dump tank 150 is connected to the pipe 54 through valve 152, so that opening of the valve 152 lowers the level of the $D_2O$ in the reaction tank substantially and thereby reduces the reactivity of the reactor. This is an additional safety control on the reactivity of the reactor. The $D_2O$ in the dump tank 150 may either be transferred back into the cooling system through valve 154, pump 144 and valve 148, or it may be transferred through a heavy water purifier 156. A heavy water ion exchange 158 is also connected between the pipe 118 and the output side of the pumps 120 and 122, as illustrated in Figure 9.

With the reactor operating at a power level of 2,000 kilowatts and using 14 fuel assemblies, with 10 fuel plates 104 each, one of the outer two assemblies on each side of the pile having been removed and the apertures plugged up, the fuel plates 104 will attain a temperature of 88° C. maximum. The flow of heavy water through the fuel elements 24 is 900 gals. per minute, and the discharge temperature of the heavy water coolant is 51° C., the heavy water entering the tank 20 of the reactor at a temperature of 43.5° C. These operating conditions are established using one heat exchanger 124 or 126, but without using refrigerated water from the tank 134.

Figure 10:
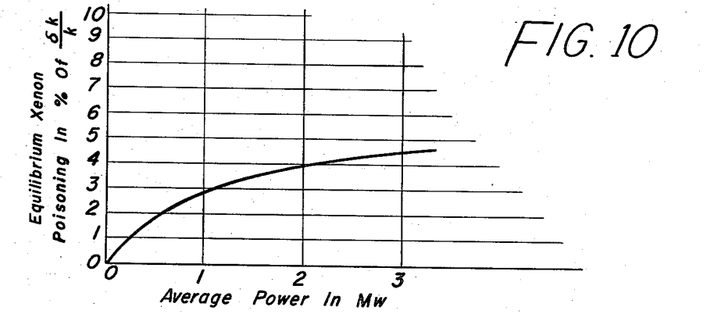
Figure 10 is a graph showing the relation of the average power level of the reactor to the reactivity loss resulting from equilibrium xenon 135 poisoning in percent of $$\frac{\delta k}{k}$$
Figure 11:
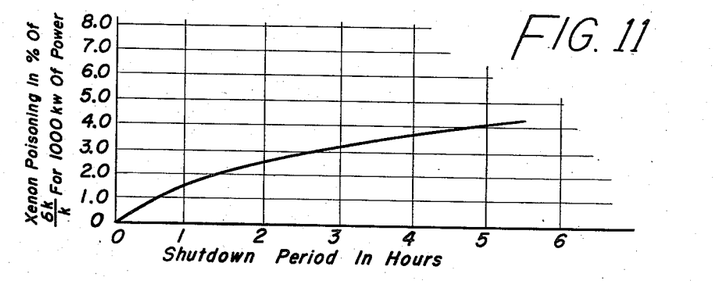
Figure 14:
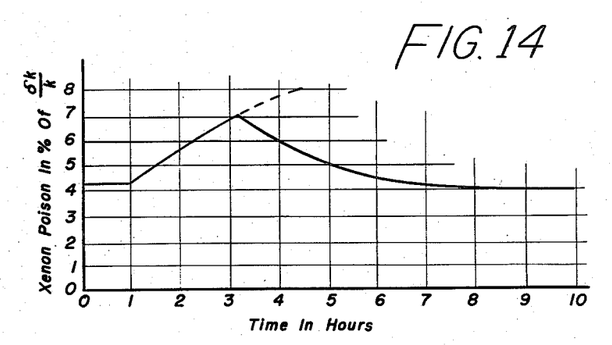

Figure 10 shows the equilibrium xenon concentration within the reactor for different power levels of operation, assuming the reactor has been operated for a sufficient period of time at a constant neutron flux to establish equilibrium xenon. From Figures 11 and 14, it is seen that when the reactor is shut down, the xenon concentration rises above the equilibrium concentration in the reactor, Figure 11 showing the effect of time on the peak xenon concentration. Figure 14 illustrates a shut-down for 2¼ hours during which time the xenon concentration has risen from 4.25 percent $$\frac{\delta k}{k}$$

to 7 percent $$\frac{\delta k}{k}$$

If the reactor is started after a shutdown of 2¼ hours without using the chilled water system, the reactivity will rise in the reactor due to the fact that the xenon concentration will diminish according to the burnout curve set forth in Figure 14.

In order to overcome the increased reactivity of the reactor due to the burnout of the xenon peak, it is necessary to reduce the reactivity of the reactor by some means progressively to maintain a reactivity loss of 7 percent $$\frac{\delta k}{k}$$

for the combined xenon loss and reactivity loss due to the controlling means. This controlling means may be the control arms 84 of the reactor, or, according to the teachings of the present invention, a reactivity loss achieved by increasing the temperature of the reactor.

Figure 12:
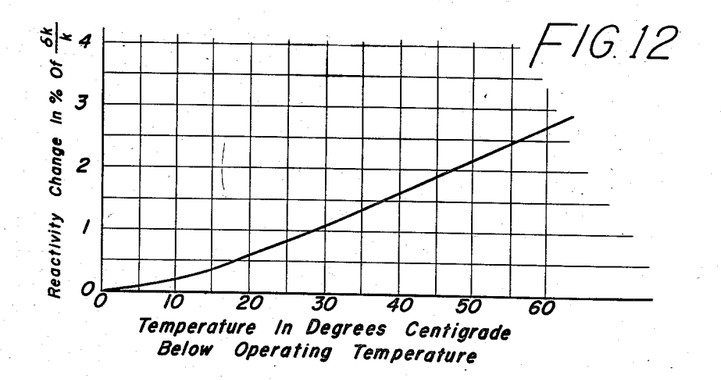
Figure 12 is a graph illustrating the relation of average temperature to reactivity change in the reactor in percent $$\frac{\delta k}{k}$$

As shown in Figures 11 and 14, the reactivity loss due to the xenon peak is approximately 2.7 percent $$\frac{\delta k}{k}$$

when the reactor has been operated at a power level of 2000 kilowatts and shut down for a period of 2¼ hours. In order to entirely compensate for this loss in reactivity due to the xenon peak, the temperature of the reactor must be reduced by approximately 62° C., as indicated by Figure 12.

Figure 13:
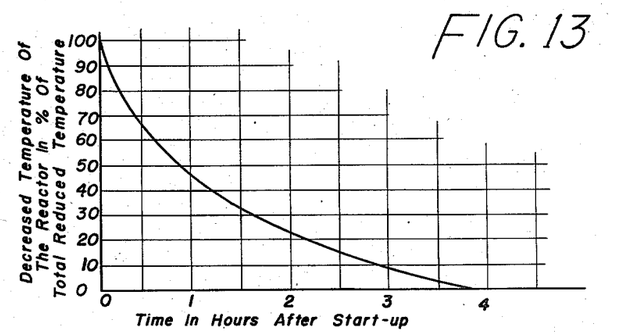
Figure 13 is a graph showing the relation between the reactor average temperature following start-up after a period of shutdown of 2¼ hours from an average power level of 2000 kw. relative to the period of time the reactor has been operating after start-up, the reactor average temperature being shown in percent of the total temperature difference between the normal operating temperature and the average temperature to which the reactor was lowered during the shutdown period.

It is thus clear, that the reactor may be started after a period of shutdown of approximately 2¼ hours without a change in the reactivity of the reactor, if the temperature of the reactor is reduced by 62° C. By reducing the temperature of the reactor by this amount, the positions of the control arms 84 of the reactor will not be altered following start-up, even though there has been a substantial increase in the xenon concentration within the reactor. However, a neutronic reaction will rapidly increase the temperature once it is restarted due to the fact that considerable heat is liberated by the neutronic chain reaction. This causes the temperature of the reactor to increase relatively rapidly and to assume the operating temperature which the reactor had prior to shutdown. As indicated by Figure 13, the active portion of the reactor must warm up over a period of approximately 3.6 hours in order to reduce the reactivity of the reactor to compensate for the increased reactivity due to destruction of the xenon peak. Since the reactor normally would reach full operating temperature in a much shorter period of time, cold coolant water must be supplied to the reactor in order to limit the temperature of the active portion in accordance with Figure 13. This has been accomplished by means of the chilled water system set forth in Figure 9.

In the chilled water system, a thirty-ton capacity refrigeration system 136 is used to chill 30,000 gallons of $H_2O$ in the tank 134. The chilled water from the tank 134 is circulated in heat transfer relationship with the $D_2O$ coolant in the heat exchangers 124 or 126, thereby cooling the core 22 of the reactor to the desired temperature during shutdown. Table 2 shows an example of the start-up of the reactor shown in the figures and described in this specification using the disclosed flow rates and dimensions in which the entire xenon peak reactivity is temperature compensated.

Table 2.—*Example of start-up using chilled water system to compensate for destruction of xenon peak*

| | |
|---|---|
| Temperature of reactor operation prior to shutdown ° C | 72 |
| Power level of reactor kw | 2000 |
| Period of constant neutron flux operation prior to shutdown hours | 6 |
| Period of shutdown do | 2¼ |
| Temperature of reactor at start-up, reactor assumes previous neutron flux ° C | 10 |
| Reactor temperature at: | |
| Start-up ° C | 10 |
| After ¼ hour ° C | 22.4 |
| After 1 hour ° C | 43.5 |
| After 2 hours ° C | 59 |
| After 3 hours ° C | 69 |
| After 4 hours ° C | 72 |
| Number of gallons of $D_2O$ in the system | 1560 |
| Number of gallons of $H_2O$ in the system | 30,000 |
| Rate of flow of $D_2O$ and $H_2O$ g./m | 700 |

The relative sizes of the chilled water tank 134 and the reactor tank 20 are also important. If the chilled water tank 134 is too small, the reactor temperature cannot be maintained within the desired limits. It has been found that the chilled water circulating system should contain between 18 and 22 times the volume of $H_2O$ as the $D_2O$ circulating system contains $D_2O$ in order to compensate for the xenon peak in the manner here disclosed with the refrigeration and flow rates set forth.

When the reactor is restarted, there are 30,000 gallons of $H_2O$ in the chilled water tank 134 which is of the desired temperature. There are about 1560 gallons of $D_2O$ in the tank 20 of the reactor and $D_2O$ circulating system. It is thus clear, that the coolant $D_2O$ may be circulated through the reactor core for a considerable period of time before the chilled water tank 134 is exhausted and the $H_2O$ therein begins to recirculate. Even though the refrigeration system 136 continues to operate, the water in the tank 134 becomes warmer as it is recirculated through the heat exchangers 124, 126 and the tank 134. Complete mixing of the water in the chilled water tank 134 is achieved by means of internal distribution pipes, designated 135. As a result, the temperature of the core of the reactor does not increase uniformly, but rather increases by steps which roughly correspond to the period of time required for the chilled water to circulate through the cooling system.

Also, when the reactor is first restarted, the temperature of the $D_2O$ in the active portion of the reactor rapidly rises. This is partially because of the fact that the heat exchanger 124 or 126 requires a temperature gradient in order to transfer heat from the heavy water system to the light water system. This results in the heavy water system becoming too warm too soon, and then being cooled too much. It has been found, that these difficulties can be somewhat alleviated and the temperature of the core of the reactor made to follow the desired warm-up curve, as shown by Figure 12, if the active portion of the reactor is cooled to a temperature of approximately 20° F. above that of the water in the chilled water tank 134 at the time the reactor is restarted. When operated in this manner, the heat exchangers 124 or 126 are provided with the necessary temperature gradient, and the heavy water circulating system is immediately cooled from the inception of operation. As a result, the temperature of the heavy water in the active portion of the reactor is not allowed to get ahead of the temperature of the chilled water system, and a better correspondence may be obtained between the ideal warm-up curve for the active portion of the reactor and that obtained in practice. Table 3 illustrates starting up the reactor in this manner. It is to be noted that the greatest effects of this method are noticed on the reactor core temperature in the first hour.

It is also to be noted that the heat exchangers 124 and 126 may be connected in series and in parallel, as well as used singly. This construction permits greater flexibility in maintaining proper temperatures, particularly when compensating for xenon peaks at higher power levels than those here disclosed.

Table 3.—*A second example of start-up using chilled water system to compensate for destruction of xenon peak*

| | |
|---|---|
| Temperature of reactor operation prior to shutdown ° C | 77 |
| Power level of reactor kw | 2000 |
| Period of constant neutron flux operation hrs | 6 |
| Period of shutdown hrs | 2¼ |
| Temperature of reactor core at start-up, reactor assumes previous neutron flux ° C | 15 |
| Temperature of $H_2O$ in tank 134 at start-up ° C | 11 |
| Number of gallons of $D_2O$ in the system | 1560 |
| Number of gallons of $H_2O$ in the system | 30,000 |
| Temperature of core: | |
| After ¼ hour ° C | 27 |
| After 1 hour ° C | 48 |
| After 2 hours ° C | 64 |
| After 3 hours ° C | 74 |
| After 4 hours ° C | 77 |
| Rate of flow of $D_2O$ and $H_2O$ g./m | 700 |

The man skilled in the art will readily devise many other objects and advantages for the present invention. For example, the present invention may be practiced with any reactor having a negative temperature coefficient wherein the temperature of the reactor may be lowered sufficiently to overcome the xenon reactivity peak. For these reasons, it is intended that the scope of the present invention be not limited except insofar as set forth in the appended claims.

What is claimed is:

1. The method of operating a neutronic reactor with a negative temperature coefficient of reactivity comprising the steps of sequentially maintaining a neutronic chain reaction in the reactor to establish an equilibrium xenon concentration, shutting down the reactor for a period of time less than 72 hours, lowering the temperature of the reactor during the period of shutdown by an amount sufficient for the negative temperature coefficient of reactivity to increase the reactivity of the reactor equal to the decrease in reactivity due to the peak xenon concentration, generating a neutron flux within the reactor equal to the flux before shutdown, and increasing the temperature of the reactor over a period of time in accordance with the curve set forth in Figure 13.

2. The method of operating a neutronic reactor comprising the steps of sequentially maintaining a neutronic chain reaction in the active portion of the reactor to establish a xenon concentration, shutting down the reactor for a period of time less than 72 hours, thus establishing a xenon concentration peak, lowering the temperature of the reactor by an amount given by Figure 12 for the xenon peak established in the reactor, reestablishing the neutron flux density within the reactor that existed prior to shutdown, and increasing the temperature of the reactor over a period of time in accordance with the curve of Figure 13.

3. The method of operating a neutronic reactor having a tank containing a $D_2O$ moderator and a cooling reservoir containing $H_2O$ thermally coupled by a heat exchanger, comprising the steps of sequentially maintaining a neutronic chain reaction in the reactor to establish a xenon concentration, shutting down the reactor for a period of time less than 72 hours thus establishing a xenon peak, lowering the temperature of the reactor and reservoir by an amount given in Figure 12 for the xenon peak established in the reactor, reestablishing the neutron flux density within the reactor that existed prior to shutdown, and circulating the $H_2O$ and $D_2O$ through the heat exchanger to retard the temperature increase of the reactor to the curve set forth in Figure 13.

4. The method of operating a neutronic reactor having a tank containing a moderator comprising a body of $D_2O$ and a reservoir containing $H_2O$, the body of $D_2O$ and the $H_2O$ being thermally coupled by a heat exchanger, comprising the steps of sequentially maintaining a neutronic chain reaction in the reactor to establish a xenon concentration, shutting down the reactor for a period of time less than 72 hours thus establishing a xenon concentration peak, lowering the temperature of the reactor by an amount given by Figure 12 for the xenon peak established in the reactor, lowering the temperature of the cooling reservoir to a temperature approximately 20° F. below that of the reactor, reestablishing the neutron flux density within the reactor that existed prior to shutdown, circulating the $D_2O$ and $H_2O$ through the heat exchanger, and cooling the $H_2O$ in the water reservoir with a refrigeration system to increase the temperature of the reactor active portion over a period of time according to the curve set forth in Figure 13.

5. The method of operating a neutronic reactor, comprising the steps of sequentially maintaining a neutronic chain reaction in a moderator consisting of approximately 1560 gallons of $D_2O$ to establish a xenon concentration, shutting down the reactor for a period of time less than 72 hours, thus establishing a xenon peak, lowering the temperature of the reactor by an amount given by Figure 12 for the xenon peak established in the reactor, lowering the temperature of a coolant reservoir containing 30,000 gallons of $H_2O$ to a temperature of approximately 20° F. below that of the reactor, reestablishing the neutron flux density within the reactor that existed prior to shutdown, circulating the reactor $D_2O$ moderator through one passage of a two passage heat exchanger, circulating the $H_2O$ from the coolant reservoir through the second passage of the heat exchanger in thermal relationship with the moderator, and cooling the $H_2O$ in the reservoir with a 30-ton refrigeration system following reestablishment of the neutron flux, whereby the reactivity of the reactor will remain constant during the period of reestablishment of the equilibrium xenon concentration.

6. A neutronic reactor comprising, in combination, a tank, a moderator comprising a body of $D_2O$ disposed within the tank having a volume of approximately 1560 gallons, 16 fuel elements disposed within the tank and spaced from each other by approximately six inches containing uranium consisting of 93.2% $U^{235}$, the total amount of $U^{235}$ being 1.48 kg., said fuel elements having channels therein for conducting the $D_2O$ moderator in thermal relationship with the uranium, a heat exchanger having a first side and a second side, the first side being connected in series with the reactor tank, a first source of fluid coolant connected in series with the second side of the heat exchanger, a second source of fluid coolant in the form of a reservoir connected in series with the second side of the heat exchanger, said reservoir having a capacity of approximately 30,000 gallons and containing water, means to circulate the water through its circulating system and the $D_2O$ through its circulating system at a rate of approximately 700 gallons per minute, and a 30-ton refrigeration unit connected in thermal relationship with the water in the reservoir.

7. A neutronic reactor comprising, in combination, a cylindrical tank constructed of aluminum having a wall thickness of 1.27 centimeters, an inner diameter of 72 inches and a height of 86 inches, a body of $D_2O$ disposed within the tank to a height of 78 inches, 16 fuel elements disposed within the tank and spaced from each other by approximately 6 inches, 14 of said fuel elements containing 10 plates containing uranium and the other two fuel elements being disposed at the periphery of the fuel element region and containing a total of 15 plates, each plate being approximately 23⅝ inches long, approximately 2.55 inches wide, and approximately 0.020 inch thick and consisting of 17.5% uranium and 82.5% aluminum, the uranium containing 93.2% $U^{235}$ and having a weight of approximately 10.24 grams, said plates being clad by aluminum with a thickness of 0.020 inch, said plates being spaced by a distance of 0.154 inch forming passages for coolant, a heat exchanger having a first and a second side, means to circulate the $D_2O$ moderator through the first side of the heat exchanger and the passages in the fuel elements, a first source of fluid coolant connected to circulate through the second side of the heat exchanger, a second source of fluid coolant in the form of a reservoir containing 30,000 gallons of water connected to the second side of the heat exchanger, a 30-ton refrigeration unit coupled into the reservoir, and means to circulate the water from the reservoir through the heat exchanger.

8. The method of operating a neutronic reactor with a negative temperature coefficient comprising the steps of sequentially maintaining a neutronic chain reaction in the reactor to establish a constant operating temperature and an equilibrium xenon concentration, flowing a coolant fluid through the reactor at a constant rate, circulating a second coolant fluid from its own source in heat exchange relationship with the first coolant fluid to establish a constant operating temperature for the reactor, shutting down the reactor for a period of time less than 72 hours, lowering the entering temperature of the first coolant fluid to reduce the average temperature of the reactor by an amount sufficient for the negative temperature coefficient of reactivity to increase the reactivity of the reactor equal to the decrease in reactivity due to the development of a peak xenon concentration by circulating a third coolant fluid from its own source in heat exchange relationship with the first coolant fluid, the source for the third coolant fluid having a lower temperature than that for the second coolant fluid, generating a neutron flux within the reactor equal to the flux before shutdown, and gradually increasing the temperature of the reactor over a period of time to the operating temperature thereof before shutdown during the period of time required for the xenon concentration to fall to the equilibrium value.

(References on following page)

References Cited in the file of this patent

UNITED STATES PATENTS

| | | |
|---|---|---|
| 2,708,656 | Fermi et al. | May 17, 1955 |
| 2,736,696 | Wigner et al. | Feb. 28, 1956 |
| 2,743,224 | Ohlinger et al. | Apr. 24, 1956 |
| 2,768,134 | Fermi et al. | Oct. 23, 1956 |
| 2,770,591 | Wigner et al. | Nov. 13, 1956 |

OTHER REFERENCES

"Nuclear Engineering," Part I, Chemical Engineering Progress Symposium Series, No. 11 (1954), vol. 50, publ. by American Institute of Chemical Engineers, New York, N.Y., pages 213, 221, 223. This publication states that the papers contained therein were published before the meeting held at Ann Arbor on June 20–25, 1954, at which time the papers were presented.

Nucleonics, November 1951, pages 5–17.

"The Elements of Nuclear Reactor Theory," S. C. Glasstone and M. C. Edlund, D. Van Nostrand Co., N.Y. (1952), pages 335–342.

Nucleonics, May 1953, pages 21–25.

Nucleonics, January 1954, pages 12–15.

Nucleonics, August 1954, pages 8–11.